US009807990B2

United States Patent
Kobayashi et al.

(10) Patent No.: US 9,807,990 B2
(45) Date of Patent: Nov. 7, 2017

(54) DOUBLE BEARING REEL

(71) Applicant: Globeride, Inc., Tokyo (JP)

(72) Inventors: Mikiharu Kobayashi, Tokyo (JP);
Masahiro Ootake, Tokyo (JP);
Katsuya Masaki, Tokyo (JP); Tomoaki Sakiyama, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 15/208,926

(22) Filed: Jul. 13, 2016

(65) Prior Publication Data
US 2017/0013818 A1    Jan. 19, 2017

(30) Foreign Application Priority Data

Jul. 14, 2015 (JP) .................................. 2015-140704

(51) Int. Cl.
*A01K 89/01* (2006.01)
*A01K 89/015* (2006.01)
*B25G 1/10* (2006.01)

(52) U.S. Cl.
CPC ...... *A01K 89/0193* (2015.05); *A01K 89/0192* (2015.05); *B25G 1/102* (2013.01)

(58) Field of Classification Search
CPC .......................... A01K 89/015; A01K 89/0192
See application file for complete search history.

(56) References Cited

U.S. PATENT DOCUMENTS

| D280,846 | S | * | 10/1985 | Sakamoto | A01K 89/015 |
| | | | | | D22/140 |
| D320,834 | S | * | 10/1991 | Robbins | A01K 89/015 |
| | | | | | D22/140 |
| 5,183,221 | A | * | 2/1993 | Kawai | A01K 89/015 |
| | | | | | 242/282 |
| D349,149 | S | * | 7/1994 | Roberts | A01K 89/015 |
| | | | | | D22/140 |
| D369,642 | S | * | 5/1996 | Iwabuchi | A01K 89/015 |
| | | | | | D22/140 |
| 5,941,471 | A | * | 8/1999 | Murayama | A01K 89/015 |
| | | | | | 242/261 |
| 5,988,548 | A | * | 11/1999 | Chapman | A01K 89/015 |
| | | | | | 242/310 |
| 6,016,982 | A | * | 1/2000 | Asano | A01K 89/015 |
| | | | | | 242/310 |
| 6,315,228 | B1 | * | 11/2001 | Sato | A01K 89/015 |
| | | | | | 242/261 |
| 6,464,158 | B1 | * | 10/2002 | Sakurai | A01K 89/006 |
| | | | | | 242/283 |

(Continued)

FOREIGN PATENT DOCUMENTS

JP    2010-081883    4/2010

*Primary Examiner* — Emmanuel M Marcelo
(74) *Attorney, Agent, or Firm* — Pillsbury Winthrop Shaw Pittman, LLP

(57) ABSTRACT

One object is to provide a double bearing reel that allows a fingertip gripping the reel body to be retained well in reeling out and in a fishing line thereby to provide better grip retention of the reel body. A double bearing reel according to the present invention includes a reel body having left and right side plates. A concave finger retainer is provided in an edge of at least one of outer circumferential surfaces of the left and right side plates to retain a thick of a fingertip of a hand gripping and holding the reel body.

9 Claims, 12 Drawing Sheets

(56) References Cited

U.S. PATENT DOCUMENTS

| | | | | |
|---|---|---|---|---|
| D497,403 S | * | 10/2004 | Asano | A01K 89/015 |
| | | | | D22/140 |
| D660,938 S | * | 5/2012 | Gray | A01K 89/015 |
| | | | | D22/140 |
| 2002/0033426 A1 | * | 3/2002 | Kitajima | A01K 89/015 |
| | | | | 242/261 |
| 2004/0075005 A1 | * | 4/2004 | Myojo | A01K 89/015 |
| | | | | 242/310 |
| 2004/0144876 A1 | * | 7/2004 | Oishi | A01K 89/015 |
| | | | | 242/257 |
| 2011/0057063 A1 | * | 3/2011 | Kawasaki | A01K 89/015 |
| | | | | 242/283 |
| 2014/0183293 A1 | * | 7/2014 | Nakagawa | A01K 89/015 |
| | | | | 242/255 |
| 2014/0231570 A1 | * | 8/2014 | Ikuta | A01K 89/015 |
| | | | | 242/257 |

* cited by examiner

DOUBLE BEARING REEL

CROSS-REFERENCE TO RELATED APPLICATIONS

This application is based on and claims the benefit of priority from Japanese Patent Application Serial No. 2015-140704 (filed on Jul. 14, 2015), the contents of which are hereby incorporated by reference in their entirety.

TECHNICAL FIELD

The present invention relates to a double bearing reel, and in particular to a double bearing reel providing better grip retention on the reel body.

BACKGROUND

In a typical double bearing reel, a spool for winding a fishing line is rotatably installed between left and right side plates of a reel body, and a spool shaft for rotating integrally with the spool is supported on both sides thereof by the reel body via bearings (see, e.g., Japanese Patent Application Publication No. 2010-81883 (the "'883 Publication")).

In actual fishing operation of such a double bearing reel, a fishing line is reeled out and in sequentially. In reeling out a fishing line, the spool in a free rotation (clutch-off) state is thumbed with one hand to prevent overspeed (backlash) thereof, the hand gripping and holding the reel body and the fishing rod. On the other hand, in reeling in a fishing line, a portion of the reel body opposite to the handle side is gripped and held with one hand along with the fishing rod, the other hand operating the handle.

To grip and hold the reel body in reeling out and in a fishing line, the reel body is pressed at an outer circumferential portion thereof outside the side plates with the thick of a finger and retained not to move. Such a retention state is important to grip and hold the entire reel stably and firmly particularly in palming the entire reel such as a bait casting reel However, as in the '883 Publication, a typical double bearing reel merely has edges of the outer circumference of the side plates of the reel body slightly rounded (protruding outward in an arc-like shape) or slightly chamfered in a straight line. The edges of the outer circumference of the side plates having such shapes cannot retain a finger well and make it difficult to hold the reel body firmly by pressing the edges with the thicks of fingertips. This causes poor grip retention particularly in palming the entire reel body (palming performance) and causes strained gripping with the fingertips, and prohibits smooth fishing operation for a long period due to pain in the fingers.

SUMMARY

The present invention addresses the above problem, and one object thereof is to provide a double bearing reel that allows a fingertip gripping the reel body to be retained well in reeling out and in a fishing line thereby to provide better grip retention of the reel body.

To achieve the above object, the present invention provides a double bearing reel comprising: a reel body including left and right side plates; a spool for winding a fishing line rotatably supported between the side plates of the reel body; and a handle provided on one side of the reel body for rotating the spool, wherein a concave finger retainer is provided in an edge of at least one of outer circumferential surfaces of the left and right side plates to retain a thick of a fingertip of a hand gripping and holding the reel body.

With the above arrangement, the concave finger retainers that retain the thick of a fingertip of a hand gripping and holding the reel body may be provided in an edge of at least one of the outer circumferential surfaces of the left and right side plates, thereby to allow the fingertip gripping the reel body to be retained well in reeling out and in the fishing line and provide better grip retention on the reel body. That is, the concave finger retainers may allow the thick of a fingertip of a hand to press edges of the side plates easily and firmly so as to grip and hold the reel body securely, thereby significantly improving the grip retention particularly in palming the entire reel body (palming performance) and allowing smooth fishing operation for a long period with little pain in the fingers.

The present invention provides a double bearing reel that allows a fingertip gripping the reel body to be retained well in reeling out and in a fishing line thereby to provide better grip retention of the reel body.

DESCRIPTION OF EXAMPLE EMBODIMENTS

Figure 1:
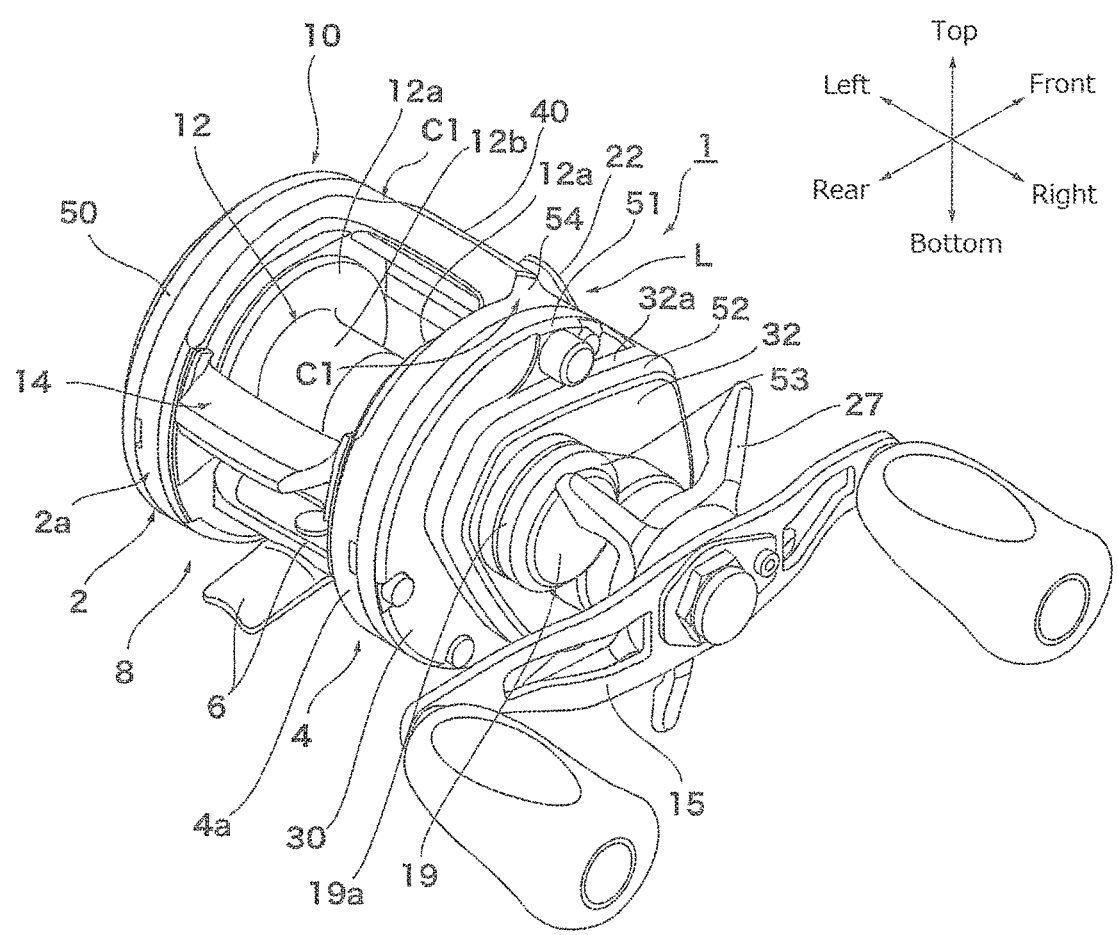
FIG. 1 is a perspective view of a double bearing reel according to an embodiment viewed perspectively downward from the handle side thereof.
Figure 2:
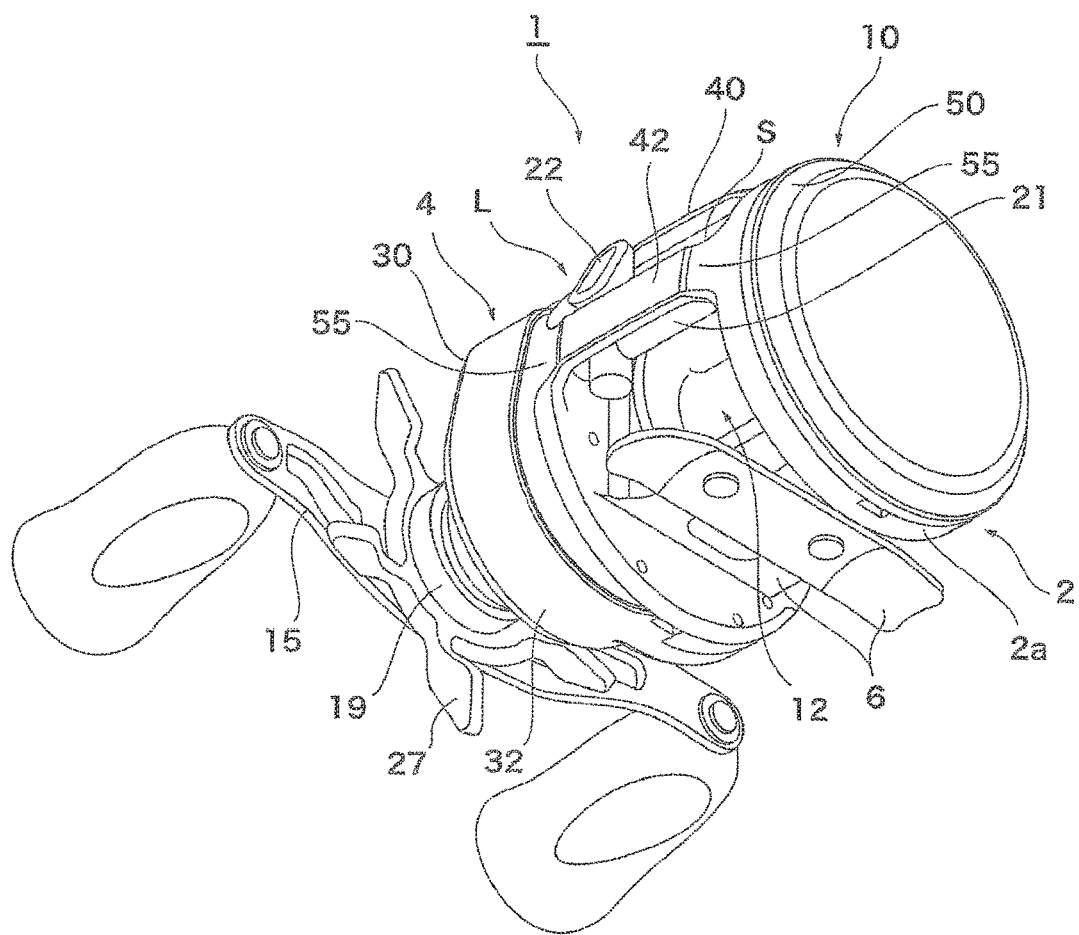
FIG. 2 is a perspective view of the double bearing reel of FIG. 1 viewed perspectively upward from the side opposite to the handle thereof.

An embodiment of a double bearing reel according to the present invention will be hereinafter described with reference to the drawings. As shown in FIGS. 1 to 8, a reel body 10 of the double bearing reel 1 may include a frame 8 integrally composed of left and right side plates 2, 4 (each including, e.g., an inner frame and an outer cover covering the inner frame, or each having integral structure) coupled together via a reel mounting leg 6 to be mounted on a fishing rod R (see FIG. 7). The reel mounting leg 6 may be separately formed and coupled to the side plates 2, 4 by screwing.

In the embodiment, the left side plate 2 positioned opposite to the handle 15 side (described later) may have a circular or cylindrical shape (exhibiting a circular shape as viewed from a side), whereas the right side plate 4 positioned on the handle 15 side may have a complex shape composed of a cylindrical portion partially protruded radially outward and axially outward, as shown particularly in FIGS. 1, 7, and 8. The left-right direction, the top-bottom direction, and the front-rear direction are herein prescribed as the directions of the arrows shown in FIG. 1.

Figure 3:
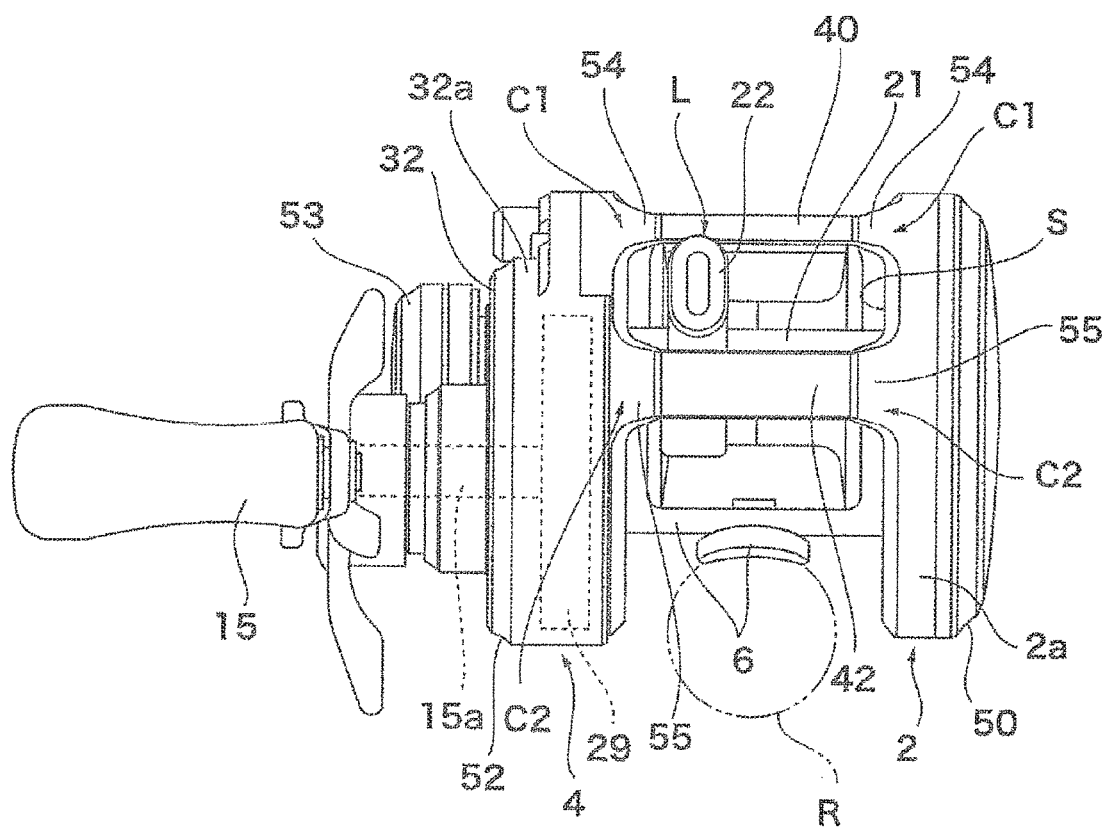
FIG. 3 is a front view of the double bearing reel of FIG. 1 (viewed from the front thereof).
Figure 4:
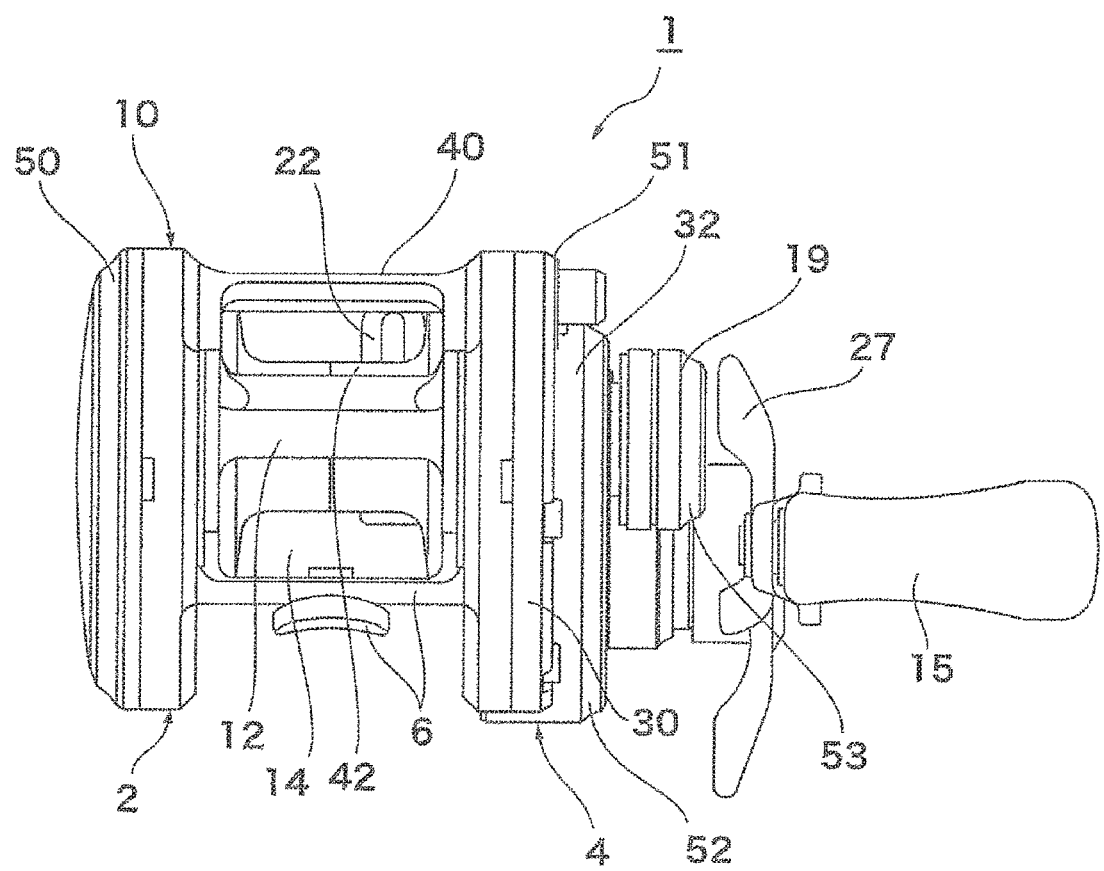
FIG. 4 is a rear view of the double bearing reel of FIG. 1 (viewed from the rear thereof).
Figure 5:
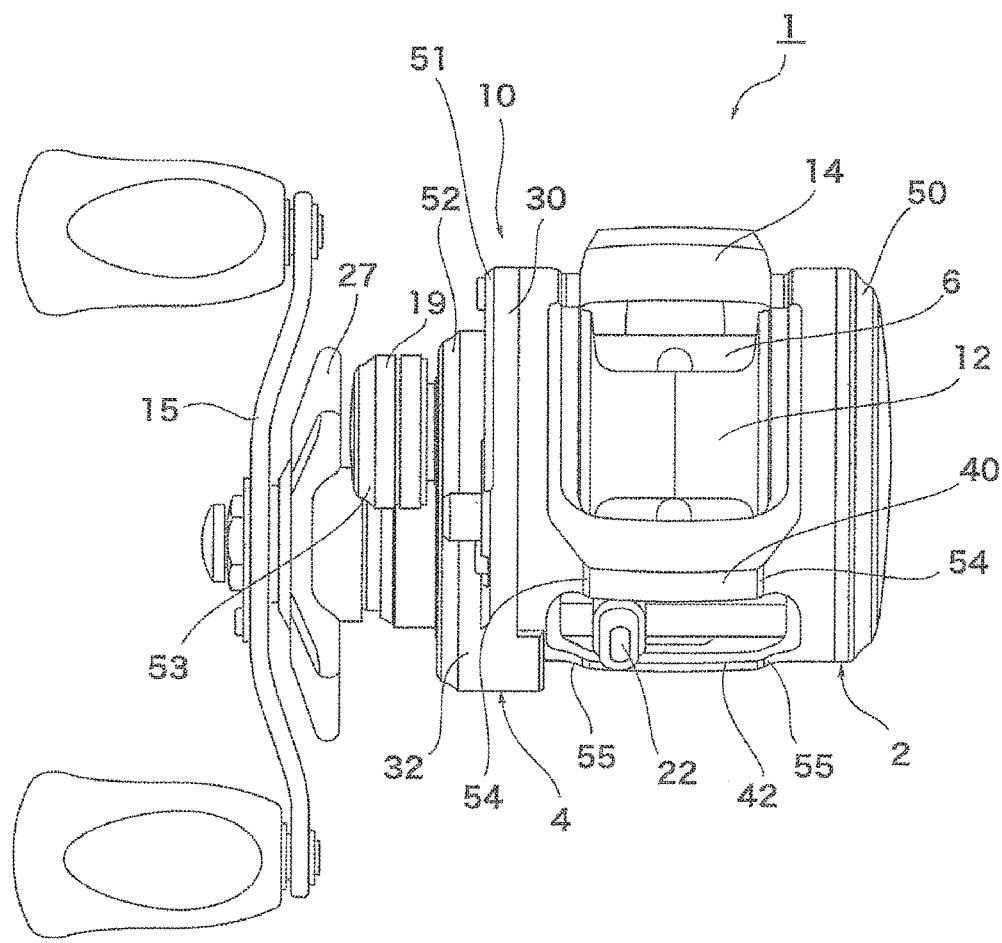
FIG. 5 is a top view of the double bearing reel of FIG. 1.
Figure 6:
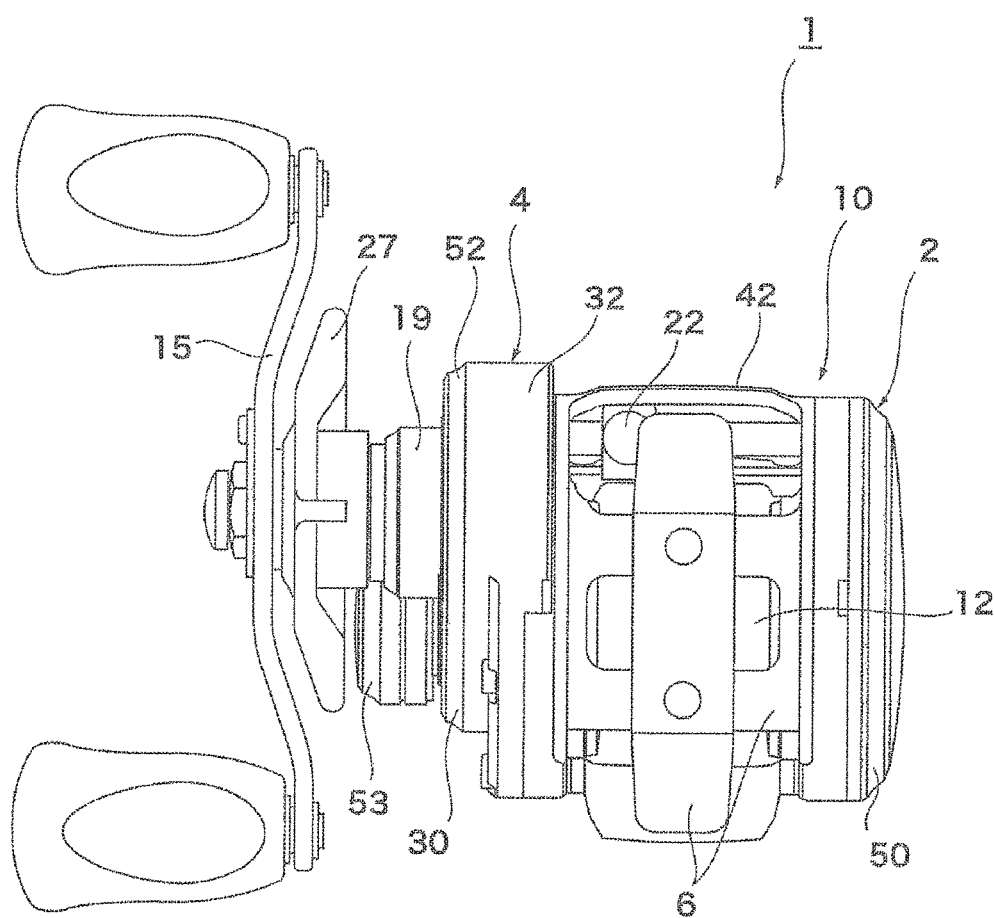
FIG. 6 is a bottom view of the double bearing reel of FIG. 1.

A spool 12 for winding a fishing line may be rotatably supported between the left and right side plates 2, 4. The spool 12 may include a pair of brims 12a, 12a and a trunk 12b between the brims around which a fishing line is to be wound, and a wind drive mechanism for rotationally driving the spool 12 may be contained in an inner space of the right side plate 4 (FIG. 3 shows a drive gear 29 and a handle shaft 15a included in the wind drive mechanism). The handle 15 may be coupled to the wind drive mechanism. When the handle 15 is rotationally operated, the spool 12 may be rotated via the wind drive mechanism.

The inner space of the right side plate 4 may also contain various constituents constituting a drag mechanism and a level wind mechanism L for winding a fishing line uniformly around the trunk 12b of the spool 12, in addition to the wind drive mechanism. The level wind mechanism L may include a screw shaft extending between the side plates 2, 4 and configured to rotate in cooperation with the wind drive mechanism, and a line guide 22 guided by the screw shaft to reciprocate left and right on a cylinder 21.

The spool shaft (not shown) configured to rotate integrally with the spool 12 can be removably engaged with a pinion (not shown) rotationally driven by the handle 15. More specifically, when a clutch mechanism (not shown) is switched between ON state and OFF state via a clutch lever 14 disposed between the side plates 2, 4, the pinion can move between an engagement position where the pinion is engaged with the spool shaft and rotates integrally with the spool shaft and a non-engagement position where the pinion is disengaged from the spool shaft.

In the non-engagement position (clutch-off), the rotation of the handle 15 may not be conveyed to the spool 12, and therefore, the spool 12 may be in a free rotation state and the fishing line can be reeled out from the spool 12. On the other hand, in the engagement position (clutch-on), the rotation of the handle 15 may be conveyed to the spool 12, and therefore, the fishing line can be reeled in onto the spool 12. Additionally, a known automatic return mechanism may be provided to automatically return the clutch mechanism to the ON state when the handle 15 is rotated during the clutch-off period allowing the free rotation of the spool 12. In the embodiment, it may be possible to press an end of the spool shaft (not shown) integrated with the spool 12 via an adjusting screw 19 provided in the outer surface of the right side plate 4 (more specifically, a protuberance in the right side plate 4 (described later)), thereby to adjust the frictional force acting on the spool shaft (the braking force on the rotation of the spool 12).

On the handle shaft 15a of the handle 15 (see FIG. 3), there may be rotatably mounted a drive gear 29 (see FIG. 3) forming a part of the wind drive mechanism along with the drag mechanism. When a star drag 27 is rotated on the handle shaft 15a, the frictional coupling force of the drive gear 29 onto the handle shaft 15a may be varied to achieve a desired drag force. Thus, the drive force produced by rotation of the handle 15 may be conveyed to the drive gear 29 via the drag mechanism and conveyed from the drive gear 29 to the spool 12 via the pinion gear and the spool shaft.

The double bearing reel 1 in the embodiment may include the reel body 10 having a small outer diameter that may facilitate casting (reeling out the fishing line) and reeling in the fishing line, and a large drive gear 29 that may improve the rotation transmitting efficiency. Thus, the right side plate 4 may include the cylindrical portion 30 encompassing the spool shaft in a rear and upper portion of the reel body 10, and a protuberance 32 having a complex-shaped circumferential wall protruding radially outward and axially outward from the cylindrical portion 30 in the front and lower portion of the reel body 10 encompassing the drive gear 29. The protuberance 32 may contain the drive gear 29.

As clearly shown in FIG. 3, a pair of beams 40, 42 extending in the left-right direction may be installed between the side plates 2, 4. These beams, the upper beam 40 and the lower beam 42 (coupling portions coupling the left and right side plates 2, 4), may be arranged, e.g., in parallel with each other. These beams 40, 42 opposed to each other in the top-bottom direction and both left and right side plates 2, 4 may define a fishing line reel-out opening S through which the fishing line is to be reeled out from the spool 12. The fishing line reel-out opening S may surround the line guide 22.

The top surface of the upper beam 40 positioned above and in front of the spool 12 may be formed as a flat thumb rest on which the thumb of a hand gripping and holding the reel body 10 from behind can be placed easily. For example, this thumb rest may have a substantially oblong shape extending in the front-rear direction along the fishing rod R mounted via the mounting leg 6 and extending in the left-right direction along the spool shaft.

In the double bearing reel 1 according to the embodiment described above, a concave finger retainer may be provided in a portion of the reel body 10 on which the thick of a finger of a hand gripping and holding the reel body 10 (and the fishing rod R, for example) can be retained, or more specifically, in an edge of at least one of the outer circumferential surfaces 2a, 4a of the left and right side plates 2, 4. Examples of such a concave finger retainer may include a concave finger retainer 50 provided in an edge on the axially outer side of the outer circumferential surface 2a of the left side plate 2 opposite to the handle side, a concave finger retainer provided in an edge on the axially outer side of the outer circumferential surface of the right side plate 4 on the handle side, or more specifically, a concave finger retainer 51 provided in an edge on the axially outer side of the outer circumferential surface 4a of the cylindrical portion 30 and/or a concave finger retainer 52 provided in an edge on the axially outer side of the outer circumferential surface 32a of the protuberance 32, a concave finger retainer 54 provided in an edge on the axially inner side of the outer circumferential surface of the side plates 2, 4, the concave finger retainer 54 forming a connecting portion C1 connecting between the upper beam 40 having a thumb rest formed therein and at least one of the outer circumferential surfaces of the left and right side plates 2, 4 (or both outer circumferential surfaces 2a, 4a of the left and right side plates 2, 4 in the embodiment), and a concave finger retainer 55 provided in an edge on the axially inner side of the outer circumferential surfaces of the side plates 2, 4, the concave finger retainer 55 forming a connection portion C2 connecting between the lower beam 42 forming the coupling portion and at least one of the outer circumferential surfaces of the left and right side plates 2, 4 (or both outer circumferential surfaces 2a, 4a of the left and right side plates 2, 4 in the embodiment).

Figure 9:
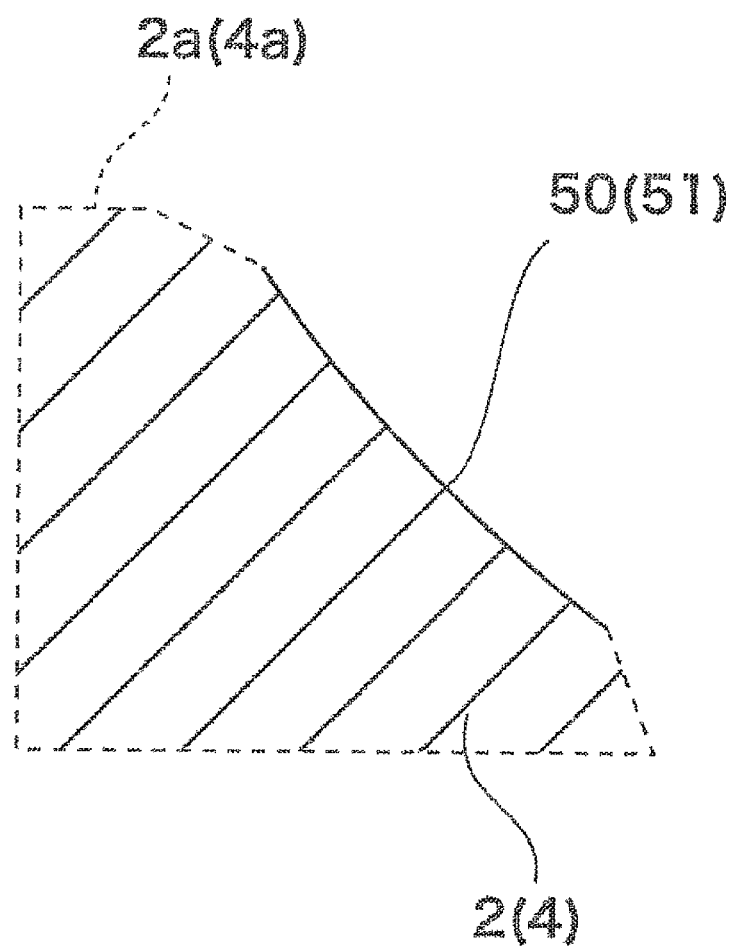
FIG. 9 is an enlarged sectional view of a main part of a concave finger retainer provided in an edge of an outer circumferential surface of a side plate (to clearly show the curved shape of the section of the finger retainer, the outer shape of the other portion of the side plate is represented with a broken line for convenience).
Figure 10:
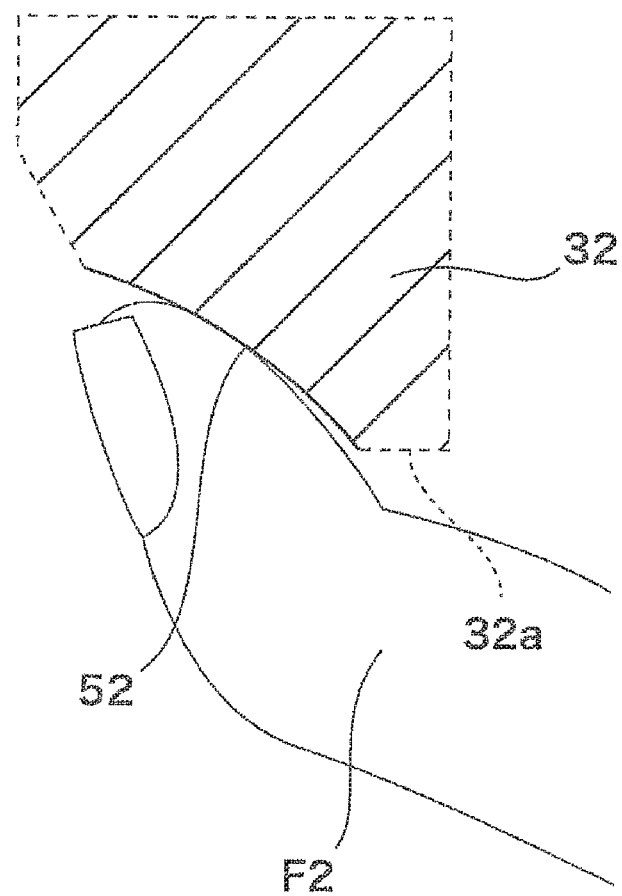
FIG. 10 is an enlarged sectional view of a main part of a concave finger retainer provided in an edge of an outer circumferential surface of a protuberance in a side plate, the view additionally including a fingertip with the thick thereof retained on the finger retainer (to clearly show the curved shape of the section of the finger retainer, the outer shape of the other portion of the protuberance is represented with a broken line for convenience).
Figure 11:
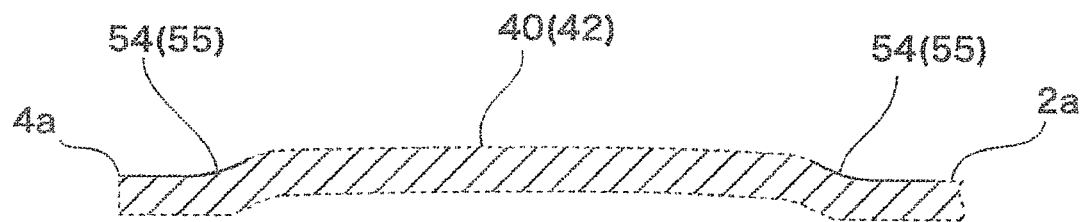
FIG. 11 is an enlarged sectional view of a main part of a concave finger retainer forming a connecting portion connecting between a thumb rest or a coupling portion and an outer circumferential surface of a side plate (to clearly show the curved shape of the section of the finger retainer, the outer shape of the other portion of the thumb rest or the coupling portion and the side plate is represented with a broken line for convenience).

As clearly shown and enlarged in FIGS. 9 to 11 (in these drawings, to clearly show the curved shape of the section of the finger retainer, the outer shape of the other portion of the member having the finger retainer formed therein is represented with a broken line for convenience), these concave finger retainers 50, 51, 52, 54, and 55 may include a curved surface in a tapered arc that is concaved inward. However, the concave finger retainers 50, 51, 52, 54, and 55 may also be V-shaped grooves. Additionally, the concave finger retainers 50, 51, 52, 54, and 55 may have a composite surface such as a combination of a plurality of curved surfaces having different radii of curvature or a combination of straight lines and curved lines in place of a single arc-like curved surface having a predetermined radius of curvature as shown, as long as the concave finger retainers have such a concave shape as to retain the thick of a fingertip of a hand gripping and holding the reel body 10. The concave finger retainers 50, 51, and 52 provided in an edge on the axially outer side of the outer circumferential surfaces of the side plates 2, 4 may extend over the entire outer circumference of the side plates 2, 4 or extend over a part of the outer circumference.

Although it is shown that all of the finger retainers 50, 51, 52, 54, and 55 are provided in the embodiment, it may also be possible that only a part of the finger retainers 50, 51, 52, 54, and 55 may be provided in accordance with the application of the reel and the expected gripping form. For example, a right-handed angler may use his right hand for casting and winding the fishing line, a right-handed angler may use his right hand for casting the fishing line and use his left hand for winding the fishing line, a left-handed angler may use his left hand for casting and winding the fishing line, and a left-handed angler may use his left hand for casting the fishing line and use his right hand for winding the fishing line. All possible way of gripping the reel body 10 may be presumed to provide the concave finger retainers at the portions of the reel body contacting the thick of the fingertip of the hand gripping the reel body 10 from the left side plate 2 side or the right side plate 4 side of the reel body.

Figure 12:
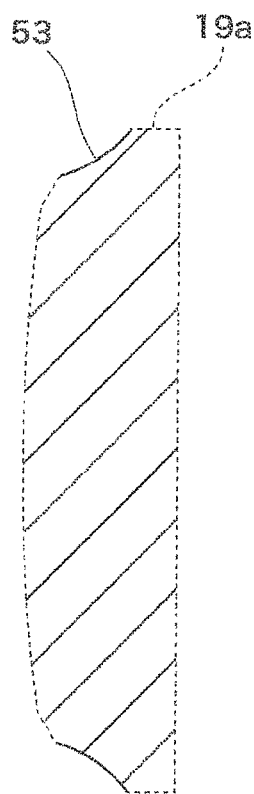
FIG. 12 is an enlarged sectional view of a main part of a concave finger retainer provided in an edge of an outer circumferential surface of an adjusting screw (to clearly show the curved shape of the section of the finger retainer, the outer shape of the other portion of the adjusting screw is represented with a broken line for convenience).

In addition to the finger retainers 50, 51, 52, 54, and 55, a concave finger retainer 53 may be provided in other portions of the reel body for possible way of gripping. For example, the concave finger retainer 53 may be provided in an edge on the axially outer side of the outer circumferential surface 19a of the adjusting screw 19 provided in the outer surface of the protuberance 32 of the right side plate 4. The finger retainer 53 may also have a curved surface in a tapered arc that is concaved inward as enlarged in FIG. 12, and may extend over the entire circumference of the outer circumferential surface 19a or extend over a part of the outer circumference 19a.

Figure 7:
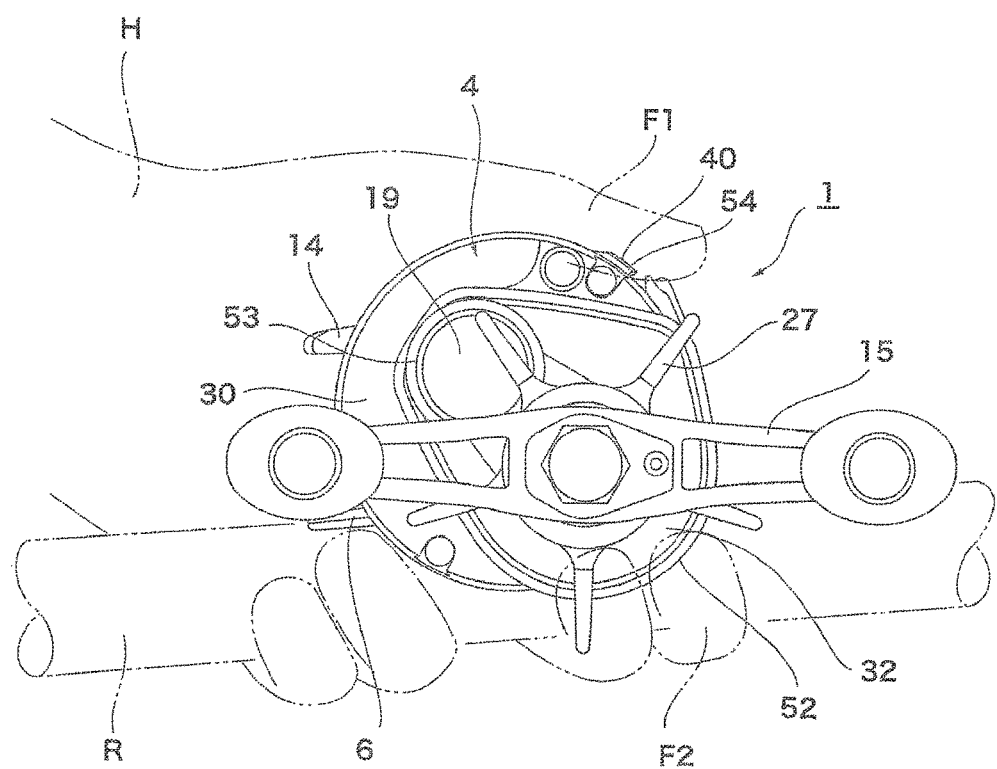
FIG. 7 is a side view of the double bearing reel of FIG. 1 viewed from the handle side thereof, the side view additionally including a fishing rod and a hand gripping the reel both drawn with a dashed-dotted line.
Figure 8:
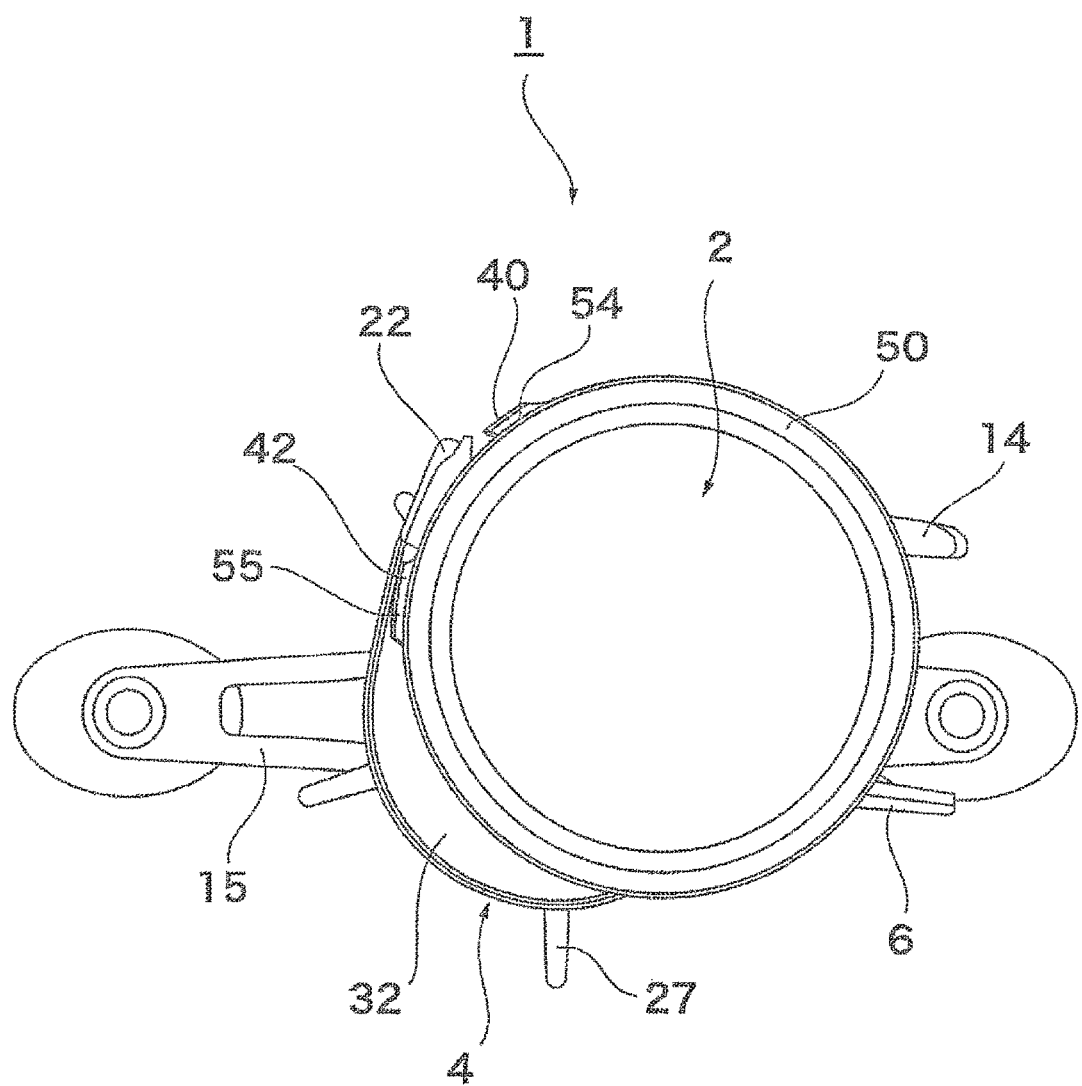
FIG. 8 is a side view of the double bearing reel of FIG. 1 viewed from the side opposite to the handle thereof.

FIG. 7 shows an example of gripping of the reel body 10 by a left hand H. In this example, the angler may grip and hold the reel body 10 and the fishing rod R with his left hand H from the left side plate 2 side, with the thumb F1 of his left hand H pressing down the concave finger retainer 54 forming the connecting portion C1 connecting between the upper beam 40 having a thumb rest formed therein and the outer circumferential surface 4a of the right side plate 4 or pressing down the concave finger retainer 51 in the cylindrical portion 30 of the right side plate 4, and with the first finger F2 and/or another finger pressing up the concave finger retainer 51 in the cylindrical portion 30 of the right side plate 4 and/or the concave finger retainer 52 in the protuberance 32. In this case, since the left side plate 2 has a circular shape as viewed laterally, it may be possible to enfold the reel body 10 with the entire palm to grip and hold it firmly and easily for reeling out and in the fishing line. Further, since the finger retainers 51, 52, and 54 have a concave shape (a curved surface in a tapered arc in the embodiment), the thick of the fingertip F2 can be securely retained on the concave finger retainer 52 formed on the lower side (the finger is retained well) as shown in FIG. 10 for example, so as to hold the reel body firmly.

Figure 13:
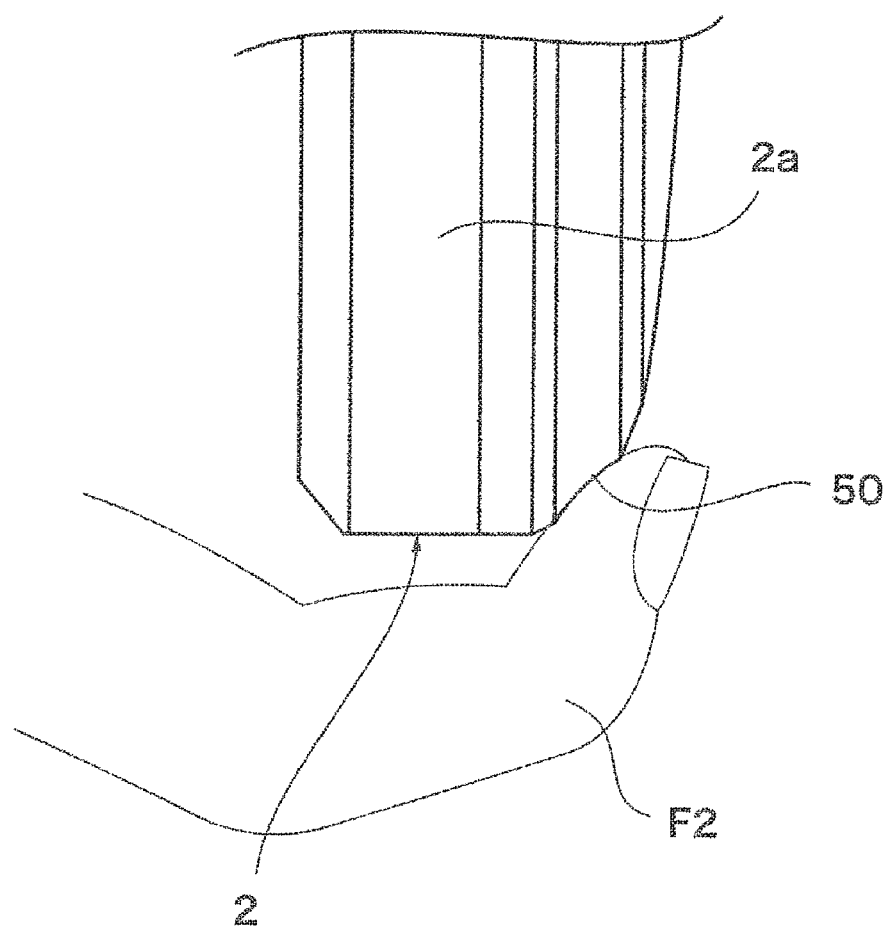
FIG. 13 is an enlarged view of a concave finger retainer provided in an axially outer edge of an outer circumferential surface of a side plate, the view additionally including a fingertip with the thick thereof retained on the finger retainer.

The same may apply to the case of gripping and holding the reel body 10 and the fishing rod R with a right hand from the right side plate 4 side. In this case, it may be possible to enfold the reel body 10 to grip and hold it firmly and easily for reeling out and in the fishing line, with the thumb of the right hand pressing down the concave finger retainer 54 forming the connecting portion C1 connecting between the upper beam 40 having a thumb rest formed therein and the outer circumferential surface 2a of the left side plate 2 or pressing down the concave finger retainer 50 of the left side plate 2, and with the thick of another finger pressing up the concave finger retainer 50 formed in an edge of the outer circumferential surface 2a of the left side plate 2. FIG. 13 shows the thick of the fingertip F2 pressing up and retained securely on the concave finger retainer 50 in this case.

According to the embodiment as described above, the concave finger retainers 50, 51, 52, 53, 54, and 55 that retain the thick of a fingertip of a hand gripping and holding the reel body 10 may be provided in an edge of at least one of the outer circumferential surfaces of the left and right side plates 2, 4, thereby to allow the fingertip gripping the reel body 10 to be retained well in reeling out and in the fishing line and provide better grip retention on the reel body 10. That is, the concave finger retainers 50, 51, 52, 53, 54, and 55 may allow the thick of a fingertip of a hand to press edges of the side plates 2, 4 easily and firmly so as to grip and hold the reel body 10 securely, thereby significantly improving the grip retention particularly in palming the entire reel body 10 (palming performance) and allowing smooth fishing operation for a long period with little pain in the fingers.

In addition to the improvement of the grip retention, the concave finger retainers 50, 51, 52, 53, 43, and 55 formed in edges of the outer circumferences of the side plates 2, 4 may also allow the reel body to appear compact.

Embodiments of the present invention are not limited to the above descriptions and are susceptible to various modifications within the purport of the present invention. For example, the geometric shape of the reel body is not limited to those of the embodiments above. The present invention (concave finger retainers) can be applied to reel bodies having various geometric shapes and sizes. The concave finger retainers can be provided in suitable positions depending on the geometric shape of the reel bodies.

What is claimed is:

1. A double bearing reel comprising:
    a reel body including left and right side plates, each of the plates including a portion having a circular shape as viewed laterally with an outer circumferential surface;
    a spool for winding a fishing line rotatably supported between the side plates of the reel body; and
    a handle provided on one side of the reel body for rotating the spool,
    wherein a concave finger retainer is provided in an edge of each of the outer circumferential surfaces of the circularly shaped portions of the left and right side plates to retain a thick of a fingertip of a hand gripping and holding the reel body.

2. The double bearing reel of claim 1, wherein the concave finger retainer of each of the side plates is provided in an edge on an axially outer side of the outer circumferential surfaces of the side plates.

3. The double bearing reel of claim 2, wherein one or both of the left and right side plates further comprises a second concave finger retainer provided in an edge on an axially inner side of the outer circumferential surface of the side plate for retaining a finger therein.

4. The double bearing reel of claim 1, wherein a thumb rest configured to retain a thumb of a hand gripping and holding the reel body is provided between the left and right side plates, and a connecting portion connecting between the thumb rest and at least one of the outer circumferential surfaces of the left and right side plates forms part of a second concave finger retainer for retaining a finger therein.

5. The double bearing reel of claim 4, further comprising a coupling portion coupling the left and right side plates together and defining a fishing line reel-out opening along with the thumb rest and the left and right side plates, the fishing line reel-out opening being configured to pass a fishing line reeled out from the spool,
    wherein the coupling portion and at least one of the outer circumferential surfaces of the left and right side plates forms another part of the second concave finger retainer.

6. The double bearing reel of claim 1, wherein the side plate on the handle side further includes a protuberance protruding in a lateral outward direction from the circularly shaped portion thereof and containing a drive gear, and wherein another concave finger retainer is provided in an edge of an outer circumferential surface of the protuberance to retain a thick of a finger therein.

7. The double bearing reel of claim 2, wherein the concave finger retainer of each of the side plates has a curved surface concaved inward.

8. The double bearing reel of claim 2, wherein the concave finger retainer of each of the side plates has a curved surface concaved inward.

9. The double bearing reel of claim 5, wherein at least one of the left and right side plates comprises a protuberance protruding in an outward direction from the circularly shaped portion thereof, and wherein another concave finger retainer is provided in an edge of an axially outer side of an outer circumferential surface of the protuberance to retain a thick of a finger therein.

* * * * *